United States Patent
Lettkeman et al.

(10) Patent No.: US 8,646,186 B2
(45) Date of Patent: Feb. 11, 2014

(54) MULTI-ANGLE LEVELS AND PLUMBING METHODS

(75) Inventors: David M. Lettkeman, Parker, CO (US); Patrick Harold Reynolds, Lakewood, CO (US)

(73) Assignee: Dish Network L.L.C., Englewood, CO (US)

( * ) Notice: Subject to any disclaimer, the term of this patent is extended or adjusted under 35 U.S.C. 154(b) by 134 days.

(21) Appl. No.: 12/970,749

(22) Filed: Dec. 16, 2010

(65) Prior Publication Data

US 2012/0151785 A1  Jun. 21, 2012

(51) Int. Cl.
*G01C 9/28* (2006.01)
*G01C 9/24* (2006.01)
*G01C 9/02* (2006.01)

(52) U.S. Cl.
USPC .................................. 33/371; 33/365; 33/379

(58) Field of Classification Search
USPC ............................................ 33/371, 365, 370
See application file for complete search history.

(56) References Cited

U.S. PATENT DOCUMENTS

| | | | | |
|---|---|---|---|---|
| 1,994,998 A | * | 3/1935 | Hull | 33/347 |
| 3,728,796 A | * | 4/1973 | Lobaugh | 33/371 |
| 4,203,639 A | | 5/1980 | Mohr et al. | |
| 4,361,375 A | | 11/1982 | Bailey et al. | |
| 4,546,549 A | * | 10/1985 | Duperon | 33/334 |
| 4,589,213 A | * | 5/1986 | Woodward | 33/371 |
| 4,850,114 A | | 7/1989 | Vockins | |
| 4,858,865 A | | 8/1989 | Schrepfer | |
| 4,888,875 A | * | 12/1989 | Strother | 33/347 |
| 4,908,949 A | * | 3/1990 | Jaccard | 33/334 |
| 4,934,706 A | * | 6/1990 | Marshall | 33/383 |
| 5,063,679 A | * | 11/1991 | Schwandt | 33/371 |
| 5,149,277 A | | 9/1992 | LeMaster | |
| 5,154,000 A | * | 10/1992 | Mahoney et al. | 33/371 |
| 5,167,075 A | * | 12/1992 | Weldy et al. | 33/371 |
| 5,306,165 A | | 4/1994 | Nadeau | |
| 5,359,820 A | | 11/1994 | McKay | |
| 5,574,256 A | | 11/1996 | Cottone | |
| 5,947,752 A | | 9/1999 | Wu | |
| 5,963,179 A | | 10/1999 | Chavez | |
| 6,180,878 B1 | | 1/2001 | Gretz | |
| 6,375,161 B2 | | 4/2002 | Garceau | |
| 6,385,856 B1 | * | 5/2002 | Godin | 33/343 |
| 6,532,675 B2 | * | 3/2003 | Letourneau | 33/371 |
| 6,777,611 B2 | | 8/2004 | Ewald et al. | |
| 6,834,435 B2 | | 12/2004 | Turner | |
| 6,996,911 B1 | * | 2/2006 | Dinius | 33/481 |
| 7,000,746 B2 | | 2/2006 | Mackin et al. | |
| D522,967 S | | 6/2006 | St. Clair | |
| 7,106,082 B2 | | 9/2006 | Yoshioka | |
| 7,122,738 B2 | | 10/2006 | Kanamaru | |
| 7,220,129 B1 | | 5/2007 | Nishijima et al. | |

(Continued)

OTHER PUBLICATIONS

BMI Measuring Instruments—Canada; 9 pages.

(Continued)

*Primary Examiner* — Yaritza Guadalupe-McCall (74) *Attorney, Agent, or Firm* — Kilpatrick Townsend & Stockton LLP (57) ABSTRACT

Multi-angle levels and plumbing methods are described. In one aspect, a multi-angle level has a body made up of a base section and a rotating section rotatably secured to the base section. A leveling mechanism is disposed on the rotating section.

15 Claims, 7 Drawing Sheets

(56) References Cited

U.S. PATENT DOCUMENTS

| | | | |
|---|---|---|---|
| 7,435,901 B2 | 10/2008 | Mori et al. | |
| 7,554,036 B1 | 6/2009 | DeCosta | |
| 7,563,131 B2 | 7/2009 | Sullivan et al. | |
| 7,592,719 B2 | 9/2009 | Hoopes | |
| D603,342 S | 11/2009 | DeCosta | |
| 7,648,379 B2 | 1/2010 | Johnson et al. | |
| 7,651,353 B2 | 1/2010 | Laukhuf | |
| 7,683,853 B2 | 3/2010 | Michaelis | |
| 7,692,094 B1 | 4/2010 | DeCosta | |
| 7,741,562 B2 | 6/2010 | Crotinger et al. | |
| D632,545 S | 2/2011 | DeCosta | |
| D647,488 S | 10/2011 | DeCosta | |
| 8,336,221 B2* | 12/2012 | Steele et al. | 33/528 |
| 8,350,153 B1 | 1/2013 | DeCosta | |
| D678,840 S | 3/2013 | DeCosta | |
| D684,935 S | 6/2013 | DeCosta | |
| 8,462,075 B2 | 6/2013 | Lettkeman | |
| 2002/0003504 A1 | 1/2002 | Yoshida et al. | |
| 2002/0067591 A1 | 6/2002 | Tajima | |
| 2004/0149475 A1 | 8/2004 | Gorin | |
| 2004/0248462 A1 | 12/2004 | Dyer et al. | |
| 2005/0101183 A1 | 5/2005 | McCoy et al. | |
| 2005/0250375 A1 | 11/2005 | Allison | |
| 2006/0067066 A1 | 3/2006 | Meier et al. | |
| 2008/0117091 A1 | 5/2008 | Binder | |
| 2008/0233794 A1 | 9/2008 | Clark et al. | |
| 2009/0052122 A1 | 2/2009 | Johnson et al. | |
| 2009/0056970 A1 | 3/2009 | Hoffman et al. | |
| 2009/0124113 A1 | 5/2009 | Sexton et al. | |
| 2010/0075540 A1 | 3/2010 | Liao | |
| 2010/0141379 A1 | 6/2010 | Tucker et al. | |
| 2010/0147580 A1 | 6/2010 | Koesterich | |
| 2010/0177010 A1 | 7/2010 | Michaelis | |
| 2010/0219183 A1 | 9/2010 | Azancot et al. | |
| 2011/0021066 A1 | 1/2011 | Squires | |
| 2011/0259883 A1 | 10/2011 | DeCosta | |
| 2012/0137530 A1* | 6/2012 | Yun | 33/370 |
| 2012/0151785 A1* | 6/2012 | Lettkeman et al. | 33/371 |
| 2013/0256480 A1 | 10/2013 | Lettkeman | |

OTHER PUBLICATIONS

Checkpoint U6 V-Groove Level; ChadsToolBox.com; 6 pages.

Stanley Hand Tools: 77-009—IntelliPoint(TM) Plus Level; 1 page.

Midlite Corporation, "The Power Jumper, HDTV Power Relocation Kit," Nov. 10, 2011, www.Midlite.com, 1 page.

Powerbridge, "3D Power Cable Total Solution Connector Kit Model #TSCK Power Extension Cable Management," 2 pages.

"Powerbridge In-Wall Power Extension System Home," accessed at http://www.powerbridgesolution.com on Sep. 7, 2011, 4 pages.

Legrand, "Flat Screen Tv Cord and Cable Power Kit—CMK70," 2011, 1 page.

Author Unknown, Treestand Manual, Locon Treestands, LLC, Waterford, Ohio, known to exist on Oct. 13, 2009, 2 pages. Accessed at: http://www.locontreestands.com.

Home Depot, "PowerBridge Ultra Low Profile In-Wall System", Oct. 18, 2013, 2 pages. Retrieved from: http://www.homedepot.com/catalog/pdfImages/ef/ef60a932-d90e-4a49-aa33-576da0d6feb6.pdf.

Sewell, "DataComm Flat Panel TV Cable Organizer Remodeling Kit with Power Outlet", lnown to exist Nov. 1, 2013, 3 pages. Retrieved from: http://sewelldirect.com/Recessed-Cable-Plate-Remodeling-Kitwith-Electrical-Outlet.asp.

U.S. Appl. No. 13/085,210, filed Apr. 12, 2011, Final Office Action mailed Oct. 25, 2013, 12 pages.

U.S. Appl. No. 13/893,304, filed May 13, 2013, Non-Final Office Action mailed Aug. 1, 2013, 10 pages.

U.S. Appl. No. 13/226,929, filed Sep. 7, 2011, Non-Final Office Action mailed Jun. 28, 2013, 31 pages.

* cited by examiner

MULTI-ANGLE LEVELS AND PLUMBING METHODS

BACKGROUND

Satellite dish antenna installers generally level or plumb the mast of the satellite dish antenna so that the antenna may optimally receive satellite television signals. In this scenario, if the mast is not level, the elevation and azimuth settings may not be accurate, typically resulting in poor or no satellite television signal reception. The mast of the antenna should be plumb, both side-to-side and front-to-back. Typically, to check whether the mast is plumb, a bubble level is placed near the end of the mast, before installation of the dish to the mast. This method of plumbing cannot be used after the dish has been mounted to the mast.

SUMMARY

Multi-angle levels and plumbing methods are described. In one aspect, a multi-angle level has a body made up of a base section and a rotating section rotatably secured to the base section. A leveling mechanism is disposed on the rotating section.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is set forth with reference to the accompanying figures, in which the left-most digit of a reference number identifies the figure in which the reference number first appears. The use of the same reference numbers in different figures indicates similar or identical items or features.

FIG. 4 shows an exemplary cross-section of multi-angle level FIG. 4, according to one embodiment. More particularly, FIG. 4 shows details of a simple pivoting and indexing mechanism to rotatably couple different sections of the multi-angle level for multi-angle plumbing operations.

FIG. 5 shows an exemplary cross-section of multi-angle level 100, according to one embodiment. More particularly, FIG. 5 shows details of a socket and post pivoting and indexing mechanism to rotatably couple different sections of the multi-angle level for multi-angle plumbing operations.

DETAILED DESCRIPTION

Overview

The multi-level angles and plumbing methods described herein are used to substantially guarantee level or plumb of structures (e.g., a satellite dish antenna, and/or so on). In the exemplary scenario of using the multi-angle level to ensure plumb of a satellite dish installation, the described multi-level angles and plumbing methods can be used to substantially guarantee plumb of the installation without any need to remove components after initial installation of the dish. For instance, after at least a portion of the multi-angle level is operatively attached to a structure such as a cylindrical mast or post or a planar structure, the multi-angle level can be positioned on multiple planes via a rotatable coupling in the level's body to check for plumb of the structure (e.g., front-to-back plumb and/or side-to-side plumb) without removing the level from the structure. The rotatable coupling divides the device into a base section and a rotating section. In various implementations, the multi-angle level allows a user to rotate a leveling mechanism on a different axis so that the user may read the level without removing the level from the mount. The position of the rotatable coupling dividing the multi-angle level into independent rotating and base sections is configurable; e.g., the coupling may be in the middle of the device or offset from the middle. Where a satellite dish antenna is being installed, the multi-angle level enables the installer to check proper installation of the mast (e.g., front-to-back plumb and side-to-side plumb) with the dish installed.

These and other exemplary aspects of multi-angle levels and plumbing methods are now described in greater detail below in reference to FIGS. 1 through 15.

An Exemplary Multi-Angle Level

Figures 1, 2:
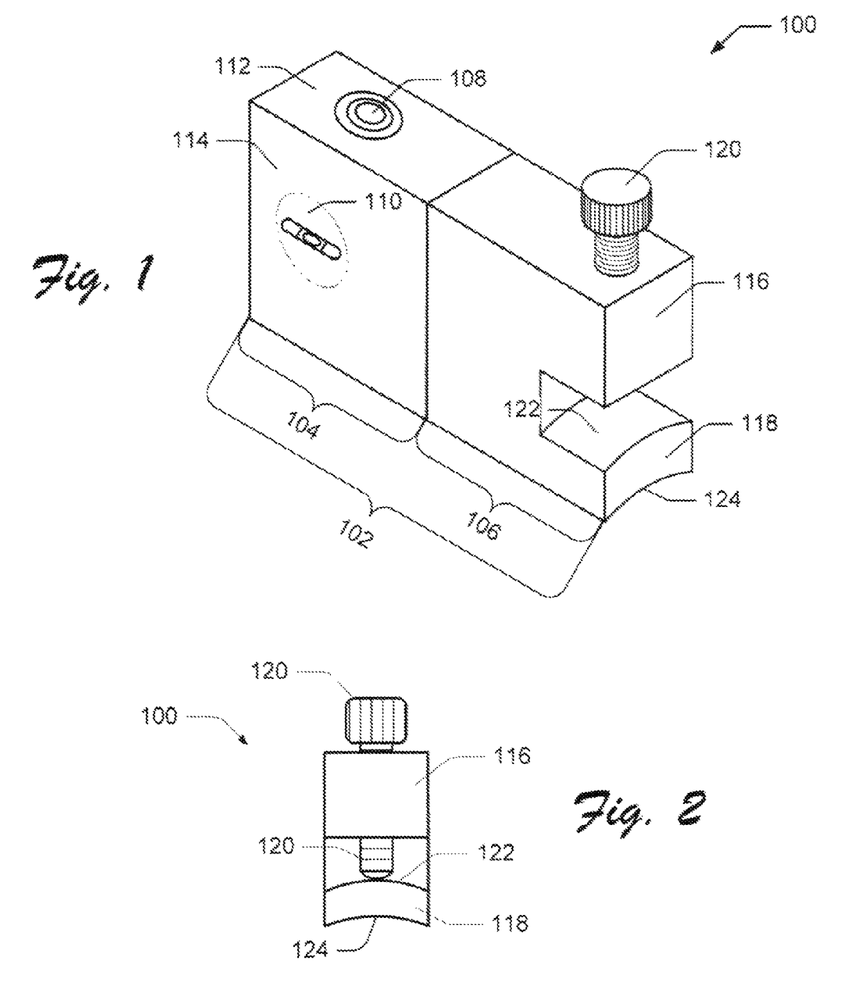
FIG. 1 shows an exemplary multi-angle level, according to one embodiment.
FIG. 2 illustrates an exemplary end view of a multi-angle level showing aspects of a clamping surface and a concave base, according to one embodiment.

FIG. 1 shows an exemplary multi-angle level 100 to facilitate checking plumb of a post or mast such as a satellite antenna mast, according to one embodiment. Multi-angle level 100 includes body 102 comprised of two sections: rotating section 104 and base section 106. Body 102 may be made of any number of materials including non-magnetic and/or non-conductive materials. In one implementation, for example, the multi-angle level is made in part from aluminum, a resilient material such as plastic, and/or so on. Rotating section 104 is rotatably coupled to base section 106. Leveling mechanisms 108 and 110 are disposed generally at or within respective first and second surfaces 112 and 114 of rotating section 104, such as being disposed in a respective hole or bore (not shown) in the corresponding first surface 112 or second surface 114. In one implementation, a leveling mechanism is located on the base section 106.

In one embodiment, leveling mechanism 108 is a bull's-eye level and leveling mechanism 110 is a rotatable bubble vial level. The bull's-eye level 108, depending on the orientation of rotating body section 104, may be used for leveling operations on a 360-degree axis, generally perpendicular to its disposed surface 112. The bubble vial 110 (or other type of leveling mechanism) is rotatable within section 104 of multi-angle level 100 independent of rotation of section 104 with respect to base section 106. For example, the bubble vial 110 is rotatable in a first plane coincident with its disposed surface 114 of rotating section 104, whereas rotating section 104 is rotatable with respect to base section 106 in a second plane that is generally perpendicular to the first plane. As a result, bubble vial 110 of this exemplary implementation is rotatable in two generally perpendicular planes.

Base section 106 of multi-angle level 100 might include a clamping mechanism comprised of top flange portion 116, a lower flange portion 118, and a clamping fastener 120 such as a thumb screw or other type of fastening apparatus. In this example, lower flange 118 comprises curved bearing surface 122 to substantially conform to a cylindrical surface during clamping operations. Where fastener 120 is a thumb screw, it is threaded (threading is not shown) through the top flange 116 extending from a top of base body section 106 to clamp to curved bearing surface 122 of lower flange 118. Fastener 120 is adapted to clamp a structure such as a plate or open end of a mast/post/tube, and/or so on, between fastener 120 and curved bearing surface 122 (e.g., see FIG. 12 for an example clamping illustration).

As shown in the exemplary implementation of FIG. 1, the bottom edge 124 of lower flange portion 118 is concave, illustrative of the concave shape of the bottom portions of base section 106 and rotatable section 104. This concave shape facilitates flush placement of multi-angle level 100 on a cylindrical surface for multi-angle plumbing operations. In another implementation, the bottom edge 124 of lower flange portion 118 is planar or flat (not shown). In this latter example, the respective bottoms of the base and rotatable sections 106 and 104 are also planar or flat.

FIG. 2 shows an exemplary end view of multi-angle level 100 of FIG. 1, according to one embodiment. As illustrated in FIG. 2, the multi-angle level clamping mechanism, i.e., top flange portion 112, lower flange portion 114, clamping fastener 116, and curved bearing surface 118, are shown from an end view perspective. As illustrated, the lower edge 124 of lower flange 118 is concave.

Figure 3:
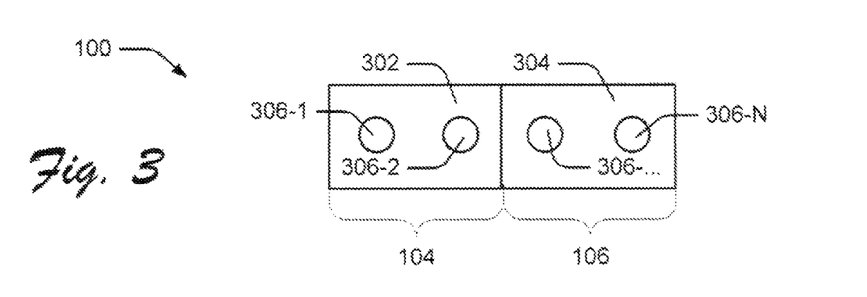
FIG. 3 illustrates an exemplary bottom view of a multi-angle level, according to one embodiment.

FIG. 3 illustrates an exemplary bottom view of multi-angle level 100, according to one embodiment. More particularly, FIG. 3 shows bottom portions 302 and 304 corresponding respectively to bottom surfaces of rotating section 104 and base section 106. In one implementation, the bottoms 302 and 304 are concave to facilitate substantially flush placement of the level onto a cylindrical surface (e.g., the mast of a satellite antenna, a post, etc.). In another implementation, the bottoms 302 and 304 are planar or flat to facilitate substantially flush placement of the level 100 onto a flat surface. In this example, one or more of bottom surfaces 302 and 304 are magnetized to facilitate hands-free attachment of the multi-angle level to a post or mast during leveling operations. For example, in one implementation, one or more magnets (e.g., magnets 306-1 through 306-N) are disposed within respective recesses (e.g., bores) on the bottom surfaces 302 and/or 304.

Figure 4:
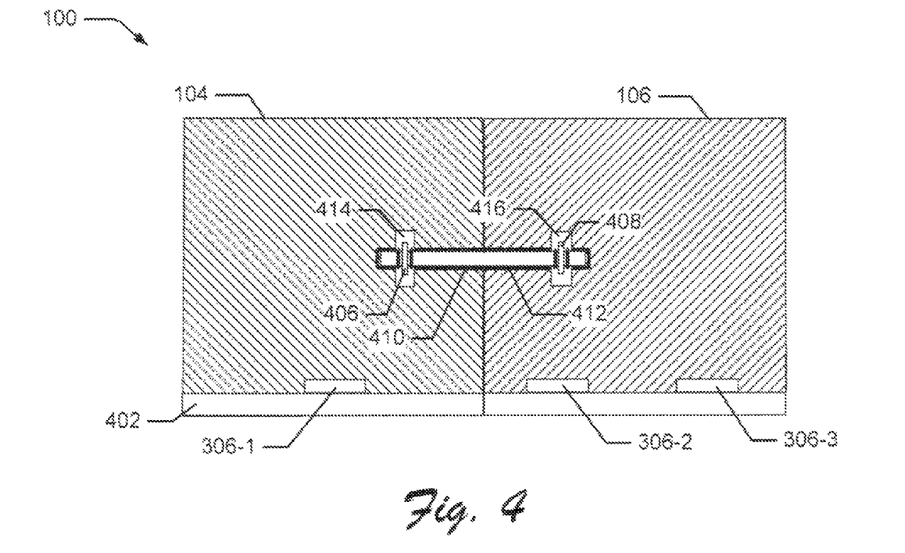

FIG. 4 shows an exemplary cross-section of multi-angle level FIG. 4, according to one embodiment. More particularly, FIG. 4 shows details of a simple pivoting and indexing mechanism to securely and rotatably couple rotatable section 104 to base section 106 for multi-angle plumbing operations. For purposes of exemplary illustration, FIG. 4 also shows a cross-sectional view of concave bottom 402 that extends across rotatable section 104 and base section 106 and embedded magnets 306 (e.g., 306-1, 306-2, and 306-3).

As illustrated, rotating section 104 is biased toward, in contact with, and rotatably secured to base section 106 by a combination of a pivot pin 404 rotatably held into place by retainers 406 and 408. In one implementation, pivot pin 404 is slidably installed into rotatable section 104 through conduit 410, and pivot pin 404 is slidably installed into base section 106 through conduit 412. Conduits 410 and 412 are configured to accommodate the design of pivot pin 404. When sections 104 and 106 are aligned and flush, as shown, conduits 410 and 412 form a continuous opening/passage for rotational and secure operation of an installed pivot pin 404. Conduits 410 and 412 are accessible for pivot pin 404 installation through respective section 104 and 106 surfaces (not shown) that are at a 90-degree angle from the current view. In one implementation, retainers 406 and 408 are c-rings. In this example, elongated access slots 414 and 416 extend near and from corresponding ends of an installed pivot pin 404 to respective surfaces of rotating section 104 and base section 106. Access slots 414 and 416 allow introduction of retainers 406 and 408 into respective sections 104 and 106 for installation (e.g., snapping/fixing) onto a pivot pin 404 that has been installed into the continuous passageway formed by mated conduits 410 and 412.

Figure 5:
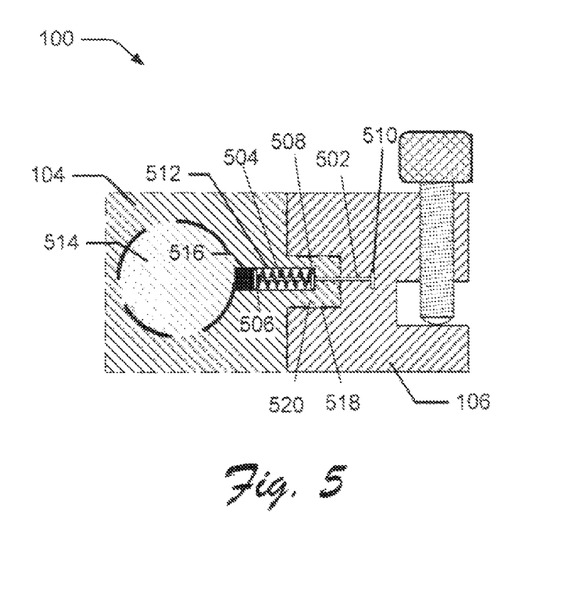

FIG. 5 shows another exemplary cross-section of multi-angle level 100, according to one embodiment. In this example, rotating section 104 is biased toward and in contact with base body section 106. In this example, rotating section 104 is rotatably secured to base section 106 by a pivot mechanism 502 such as a pivot pin. In one embodiment, rotating section 104 is biased toward base section 106 and in contact with base section 106 by a biasing element or holding mechanism, e.g., spring 504, which is disposed generally coaxial with the pivot mechanism 502. In this example, spring 504 is retained with respect to pin 502 by retainers 506 and 508, whereas pin 502 is retained in base section 106 by retainer 510.

In one implementation, pivot mechanism 502 and holding mechanism 504 are positioned within sections 104 and 106 via conduit 512. Conduit 512 is configured to accommodate pin mechanism 502, holding mechanism 504, and retainers 506, 508, and 510. In this example, conduit 512 extends from bore 514 (used to accommodate leveling mechanism 110—please see FIG. 1) from section 104 to section 106. Pivot mechanism 502 is rotatably fixed to sections 104 and 106 via a combination of cap 516 sealing one end of the conduit 512, the narrowing configuration of conduit 512 in section 104, and retainers 506 and/or 508, and 510. Cap 516, for example, is a cap screw, sealant, or any other apparatus or material that can be used to seal the end of conduit 512. In one implementation, one or more of retainers 506, 508, and 510 are c-rings. Retainers 506 and 508 may be installed via conduit 512. In one implementation, retainer 510 is installed into base section 106 via an elongated slot (not shown) extended to an outer surface of the section for attachment to pivot mechanism 502.

To provide indexing of the body section 106 with respect to body section 106, one of body sections 106 or 104 may comprise a shaped socket (e.g., round or polygonal), the other body section 106 or 104 having a corresponding post to fit into the socket. For example, body section 106 is shown comprising a generally square socket 518, while rotating body section 104 defines generally square post 520 received in socket 518. The corresponding shapes of socket 518 and post 520 can be preconfigured with other shapes and indexing angles to provide desired indexing characteristics of rotating section 104 and base section 106.

Figure 6:
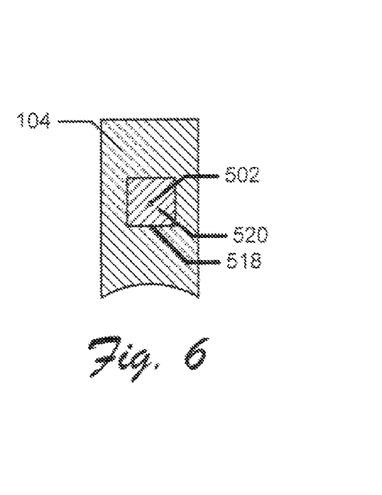
FIG. 6 shows a fragmented, generally cross-sectional, exemplary end view of a multi-angle level, according to one embodiment.

FIG. 6 shows a fragmented, generally cross-sectional, end view of exemplary multi-angle level 100, according to one embodiment. As noted, to provide indexing of the body sections of multi-angle 100, base body section 106 is shown as defining a generally square socket 518, whereas rotating body section 104 defines generally square post 520 as received in socket 518. In this example, rotating section 104 is indexed, or keyed, with base section 106 at a 90-degree angle. As such, rotating section 104 may be indexed with base section 106 such that rotating section 104 is disposed aligned with base section 106 in one or more of multiple possible progressively rotated positions (e.g., see FIGS. 5 and 7). FIGS. 1 through 6 show alignment of rotating section 104 with base section 106 when sections 106 and 104 are indexed in a first rotated position.

Figure 7:
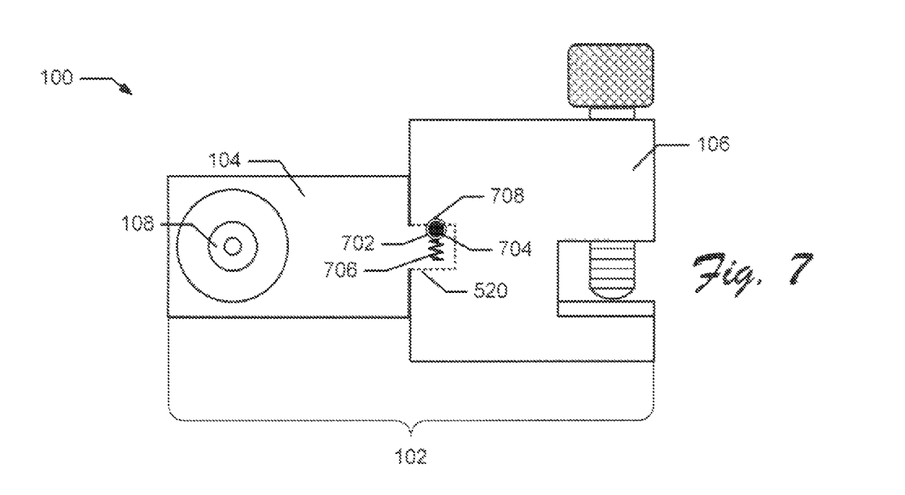
FIG. 7 illustrates an exemplary side view of a multi-angle level showing a rotating body section disposed at a right angle to a base body section in a second rotated position, according to one embodiment.

FIG. 7 illustrates an exemplary side view of multi-angle level 100, showing rotating body section 104 comprising a leveling mechanism 108 (FIG. 1) disposed at a right angle to base body section 106 in one of multiple possible indexed and progressive positions, according to one embodiment. In particular, top portion 112 (see FIG. 1) of the rotating section 104 of multi-angle level 100 is shown rotated, for example, from a first indexed position via post 520 positioning in corresponding socket (not shown) in base section 106 to a second illustrated position.

In one implementation, and to provide indexing of the body section 104 with respect to body section 106, one of body sections 104 or 106 may comprise an up conversion mode divot 702 in an interior portion to engage a larger portion of a captive bearing 704 with a spring 706 under it to hold it up, whereas the other body section will comprise a set of down conversion mode divots (e.g., down conversion mode divot 708) at regular indexed positions (e.g., 90 degrees relative to one another) to engage the smaller portion of captive bearing 704 responsive to rotation of rotatable section 104 during multi-angle plumbing operations. This figure allows the user to "snap" rotatable section 104 into place at preconfigured indexed positions while rotating the rotating section during multi-angle plumbing operations.

Figure 8:
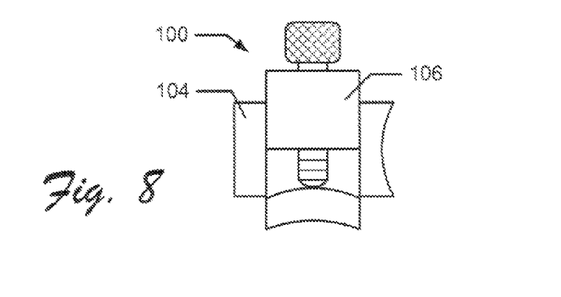
FIG. 8 illustrates an exemplary end view of a multi-angle level, also showing the rotating body section disposed at a right angle to the base body section in the second rotated position, according to one embodiment.

FIG. 8 illustrates an exemplary end view of example multi-angle level 100, also showing rotating body section 104 disposed at a right angle to base body section 106 in a second rotated position, according to one embodiment.

Figure 9:
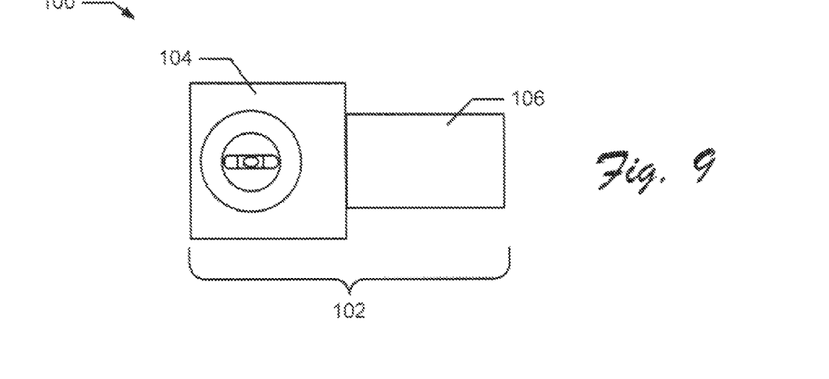
FIG. 9 shows an exemplary top view of a multi-angle level, also showing the rotating body section disposed at a right angle to the base body section in the second rotated position, according to one embodiment.

FIG. 9 shows an exemplary top view of example multi-angle level 100, also showing rotating body section 104 disposed at a right angle to base body section 106 in a second rotated position, according to one embodiment.

Figures 10, 11:
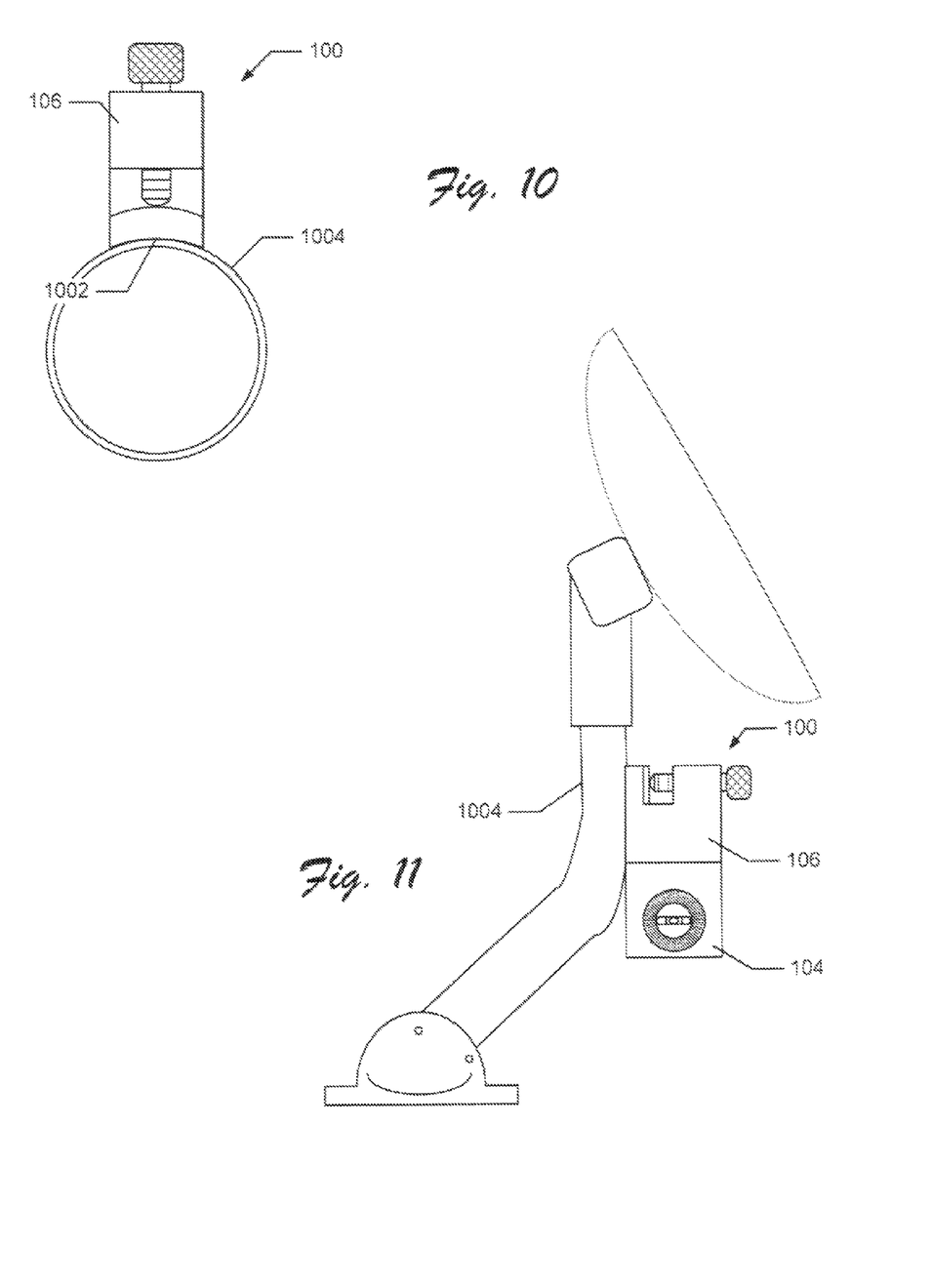
FIG. 10 shows an exemplary top end view of a multi-angle level mounted to a satellite antenna mast with the dish removed, according to one embodiment.
FIG. 11 illustrates an exemplary side view of a multi-angle level mounted to a satellite antenna mast, according to one embodiment.

FIG. 10 shows an exemplary top end view of multi-angle level 100 mounted to a satellite antenna mast with the dish removed, according to one embodiment. Therein, at least the concave bottom of base 106 can be seen mating at 1002 with mast 1004.

FIG. 11 illustrates an exemplary side view of multi-angle level 100 mounted to a satellite antenna mast, according to one embodiment. In the configuration shown in FIG. 11, level 100 is set-up to determine plumb front-to-back of mast 1004. To determine side-to side plumb of mast 1004, rotating section 104 of level 100 is rotated to index with base section 106 in the second rotated position shown in FIGS. 7 through 9 above.

Figure 12:
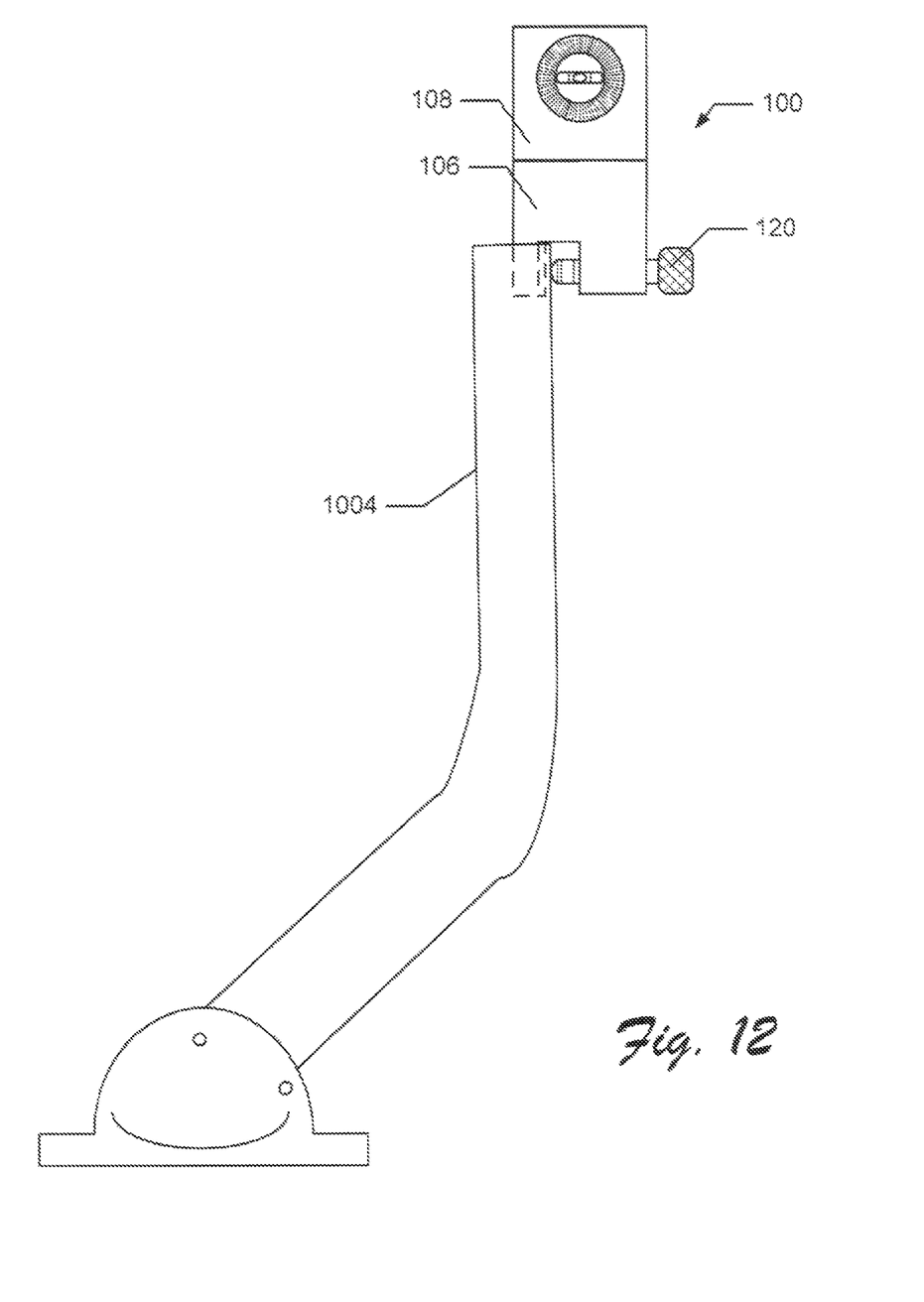
FIG. 12 shows an exemplary side view of a multi-angle level clamped to a top end of a satellite antenna mast, according to one embodiment.

FIG. 12 shows an exemplary side view of multi-angle level 100 clamped to a top end of a satellite antenna mast, according to one embodiment. Level 100 is clamped to an open top of mast 1004 in FIG. 12 (i.e., thumb screw 120 is tightened against the exterior of mast 1004, and curved bearing surface 122 is mated to an inner surface of mast 1004). Again, in the configuration shown in FIG. 12, level 100 is set up to determine plumb front-to-back of mast 1004. To determine plumb side-to-side of mast 1004, rotating section 104 of level 100 is rotated to index with base section 106 in the second rotated position shown in FIGS. 7 through 9 above.

Figure 13:
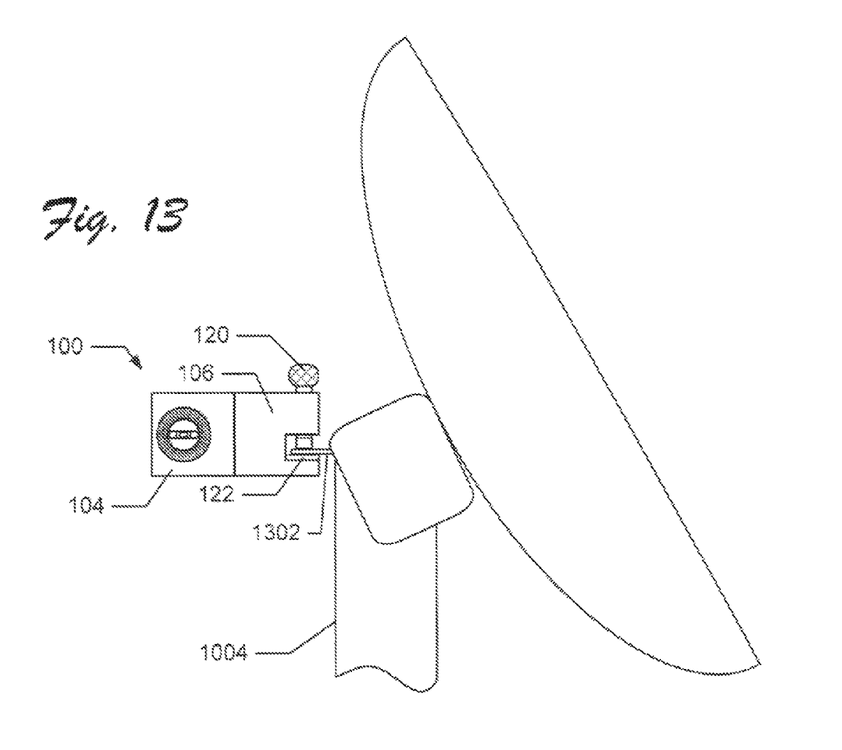
FIG. 13 shows an exemplary side view of a multi-angle level clamped to a tab extending from a top end of a satellite antenna mast, according to one embodiment.

FIG. 13 shows an exemplary side view of multi-angle level 100 clamped to tab 1302 extending generally perpendicularly from a top end of satellite antenna mast 1004, according to one embodiment.

Figure 14:
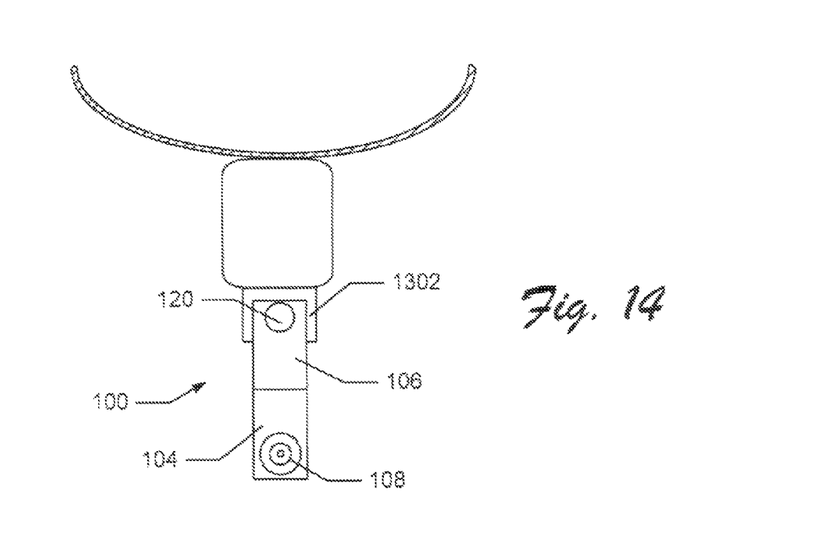
FIG. 14 shows a partially fragmented exemplary top view of a multi-angle level clamped to a tab extending from a top end of a satellite antenna mast, according to one embodiment.

FIG. 14 shows a partially fragmented exemplary top view of multi-angle level 100 clamped to tab 1302 extending generally perpendicularly from the top end of a satellite antenna mast, according to one embodiment. Therein, bearing surface 122 is in contact with a bottom surface of tab 1302.

The configuration shown in FIGS. 13 and 14 sets up level 100 to determine plumb front-to-back of mast 1004 using level vial 108. To determine side-to-side plumb of mast 1004 using level vial 108, rotating section 104 of level 100 could be rotated to index with base section 106 in the second rotated position shown in FIGS. 7 through 9 above.

Referring to FIGS. 12 through 14, bull's-eye level 108 may be used to determine plumb of mast 1004, without necessarily rotating section 104. Additionally or alternatively, bull's-eye level 108 may be used to confirm plumb of a mast that has been set using level vial 110, as described above. Conversely, level vial 110 may be used (and rotated and used again, as described above) to confirm or "fine-tune" the plumb of a mast obtained using bull's-eye level 108, particularly in the implementations shown in FIGS. 12 through 14.

An Exemplary Procedure for Checking Plumb of a Satellite Antenna Mast

Figure 15:
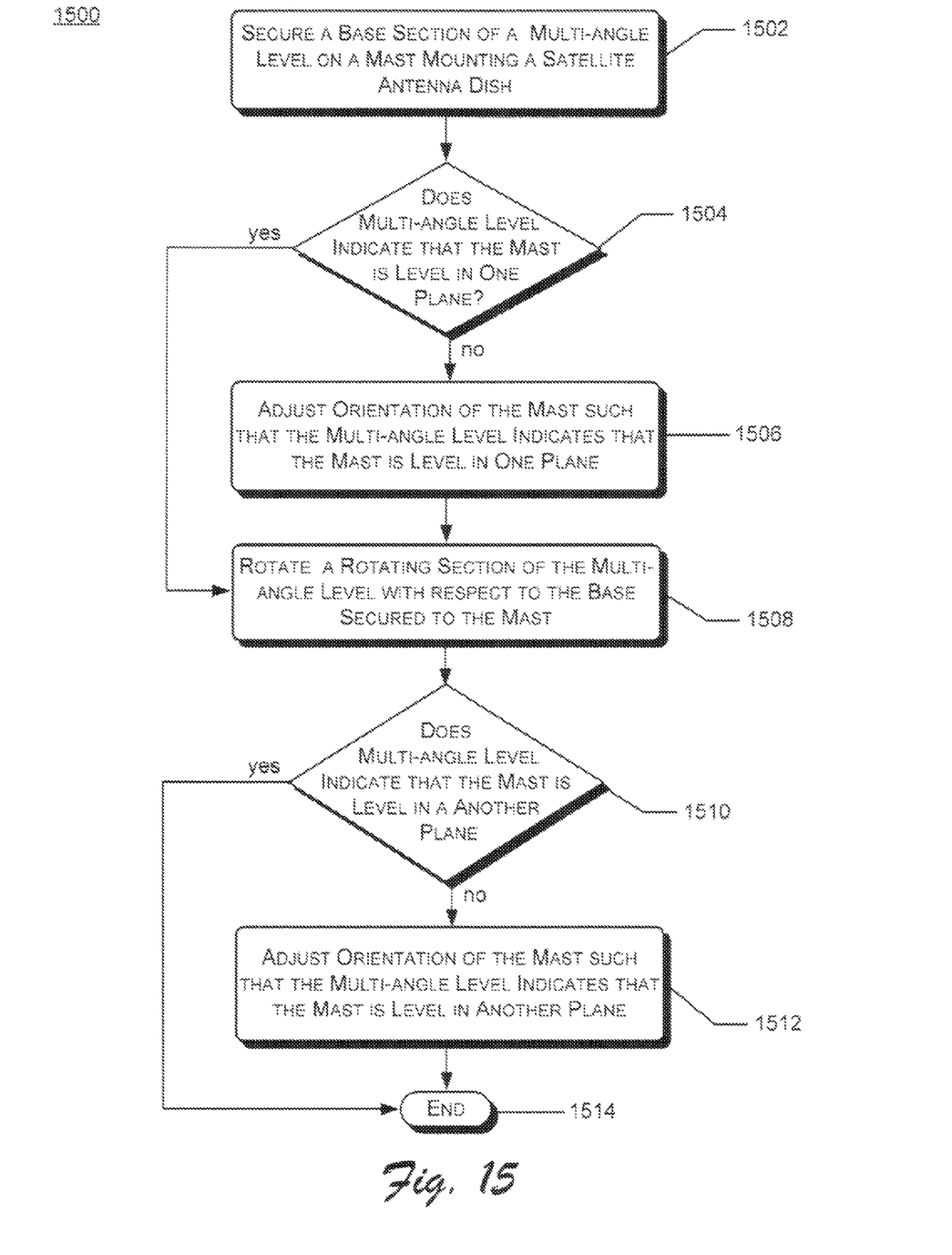
FIG. 15 shows an exemplary procedure for checking plumb and level of a satellite antenna mast, according to one embodiment.

FIG. 15 shows exemplary procedure 1500 for checking plumb of a satellite antenna mast, according to one embodiment. At 1502, a base section of the body of a multi-angle level, such as multi-angle level 100 discussed above, is secured on a mast, such as after installation and mounting of a satellite antenna dish on the mast. In this example, the level may be secured by mating a concave bottom of the multi-angle level to the mast and securing the multi-angle level to the mast using at least one magnet disposed in the concave bottom. Alternatively, the level might be secured to the mast by clamping it to an open end of the mast or a tab extending generally perpendicularly from the mast. In particular, the multi-angle level may be secured on an open top end of the mast by mating a generally curved bearing surface of a clamp extending from the body of the multi-angle level with the open top end of the mast. Then the wall of the mast is clamped between the curved bearing surface and a fastener extending generally perpendicular to the bearing surface from the body of the level.

At 1504, a determination is made as to whether the multi-angle level indicates that the mast is level in a first plane, such as back-to-front or side-to-side. If the mast is not level in the first plane, then orientation of the mast is adjusted such that the multi-angle level indicates that the mast is plumb in the first plane at 1506.

Then, or if it is determined at 1504 that the mast is level in the first plane, the level mechanism of the multi-angle level is rotated at 1508. For example, the level vial may be rotated by rotating a section of the body mounting the level vial with respect to a base section of the body secured to the mast.

At 1510, a determination is made as to whether the multi-angle level indicates that the mast is level in a second plane, for example, a plane perpendicular to the first plane. If the mast is not level in the second plane, then orientation of the mast is adjusted such that the multi-angle level indicates that the mast is plumb in the second plane at 1512.

Then, or if it is determined at 1510 that the mast is level in the second plane, the mast is plumb and procedure 1500 ends at 1514.

CONCLUSION

Although multi-angle levels and plumbing methods have been described in language specific to structural features and/or methodological operations or actions, it is understood that the implementations defined in the appended claims are not necessarily limited to the specific features or actions described. For instance, although certain examples discussed herein illustrate exemplary use of the multi-angle levels and plumbing methods to facilitate proper installation of a satellite television dish, the described multi-angle levels and methods can respectively be configured and used in any number of manners where level of structure(s) along multiple axes is desired (e.g., installation of a clock, shelving, machining equipment, medical equipment, etc.). Accordingly, the specific features and operations of multi-angle levels and plumbing methods are disclosed as exemplary forms of implementing the claimed subject matter.

The invention claimed is:

1. A multi-angle level comprising:
   a body having a base section and a rotating section, the rotating section rotatably secured to the base section, and wherein a concave portion of the base section and a concave portion of the rotating section when aligned define a concave bottom; and
   a leveling mechanism operatively coupled to the rotating section.

2. The multi-angle level of claim 1, wherein the leveling mechanism is rotatable within the rotating section of the body.

3. The multi-angle level of claim 1, wherein the rotating section of the body is rotatable with respect to the base section in a first plane, and wherein the leveling mechanism is rotatable within the rotating section of the body in a second plane.

4. The multi-angle level of claim 1, wherein the rotating section is biased toward the base section.

5. The multi-angle level of claim 1, wherein the rotating section is rotatably secured to the base section by a pivot.

6. The multi-angle level of claim 1, wherein the rotating section is rotatably secured to the base section by a pivot and the rotating section is biased toward the base section.

7. The multi-angle level of claim 1, wherein the rotating section is indexed with the base section.

8. The multi-angle level of claim 1, wherein the rotating section is indexed with the base section such that the rotating section is disposed aligned with the base section in one rotated position and the rotating section is disposed at a right angle to the base section in another rotated position.

9. The multi-angle level of claim 1, wherein the rotating section is rotatably secured to the base section by a pivot and the rotating section is biased toward the base section and wherein the rotating section defines a generally square post generally coaxial with the pivot pin, the post indexed with a generally square socket defined in the base section such that the rotating section is disposed aligned with the base section in one rotated position and the rotating section is disposed at a right angle to the base section in another rotated position.

10. The multi-angle level of claim 1, wherein the leveling mechanism comprises a bubble level vial.

11. The multi-angle level of claim 1, wherein the base section of the body further comprises a clamp.

12. The multi-angle level of claim 11, wherein the clamp comprises a generally curved bearing surface and a fastener adapted to clamp a structure between the fastener and the curved bearing surface.

13. A multi-angle level comprising:
   a body comprising:
      a base section defining a socket; and
      a rotating section rotatably secured to the base section by a pivot and biased toward the base section by a holding mechanism, the rotating section defining a post generally coaxial with the pivot, the post indexed with the socket defined by the base section, the rotating section disposed aligned with the base section in one rotated position and disposed at a configurable and preconfigured angle to the base section in another rotated position, and wherein the base section and the rotating section each define a concave bottom of particular curvature; and
      a leveling mechanism disposed in the rotating section.

14. The multi-angle level of claim 13, wherein the preconfigured angle is a right angle.

15. The multi-angle level of claim 13, wherein the base section of the body further comprises a clamp, the clamp comprising:
   a generally curved bearing surface; and
   a fastener adapted to clamp a structure between the fastener and the curved bearing surface.

* * * * *